Aug. 12, 1969  D. F. LANGSAM  3,460,461
MECHANICAL HAMBURGER COOKER
Filed Sept. 22, 1965  3 Sheets-Sheet 1

INVENTOR
DANIEL F. LANGSAM
BY
Cushman, Darby & Cushman
ATTORNEYS

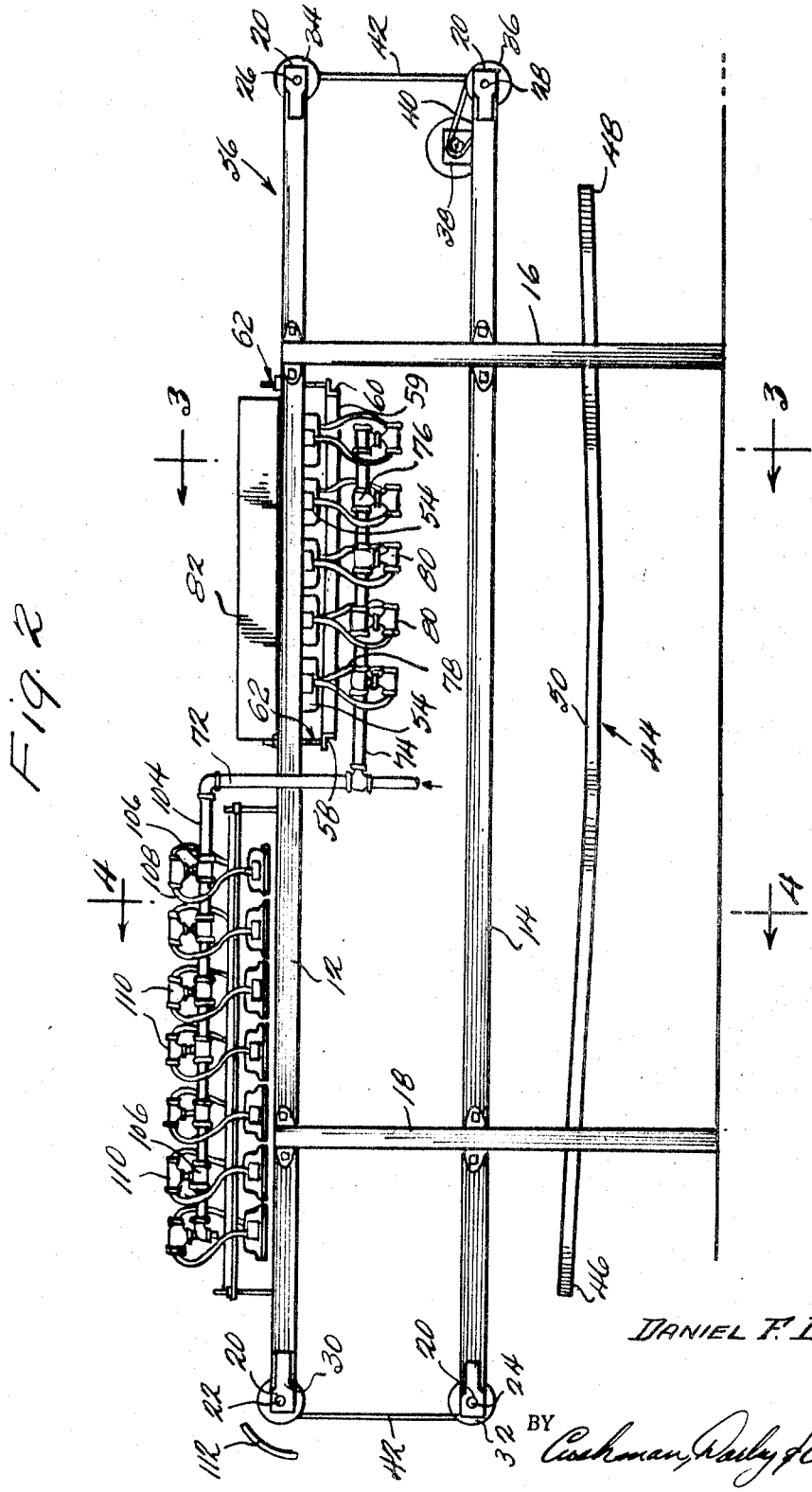

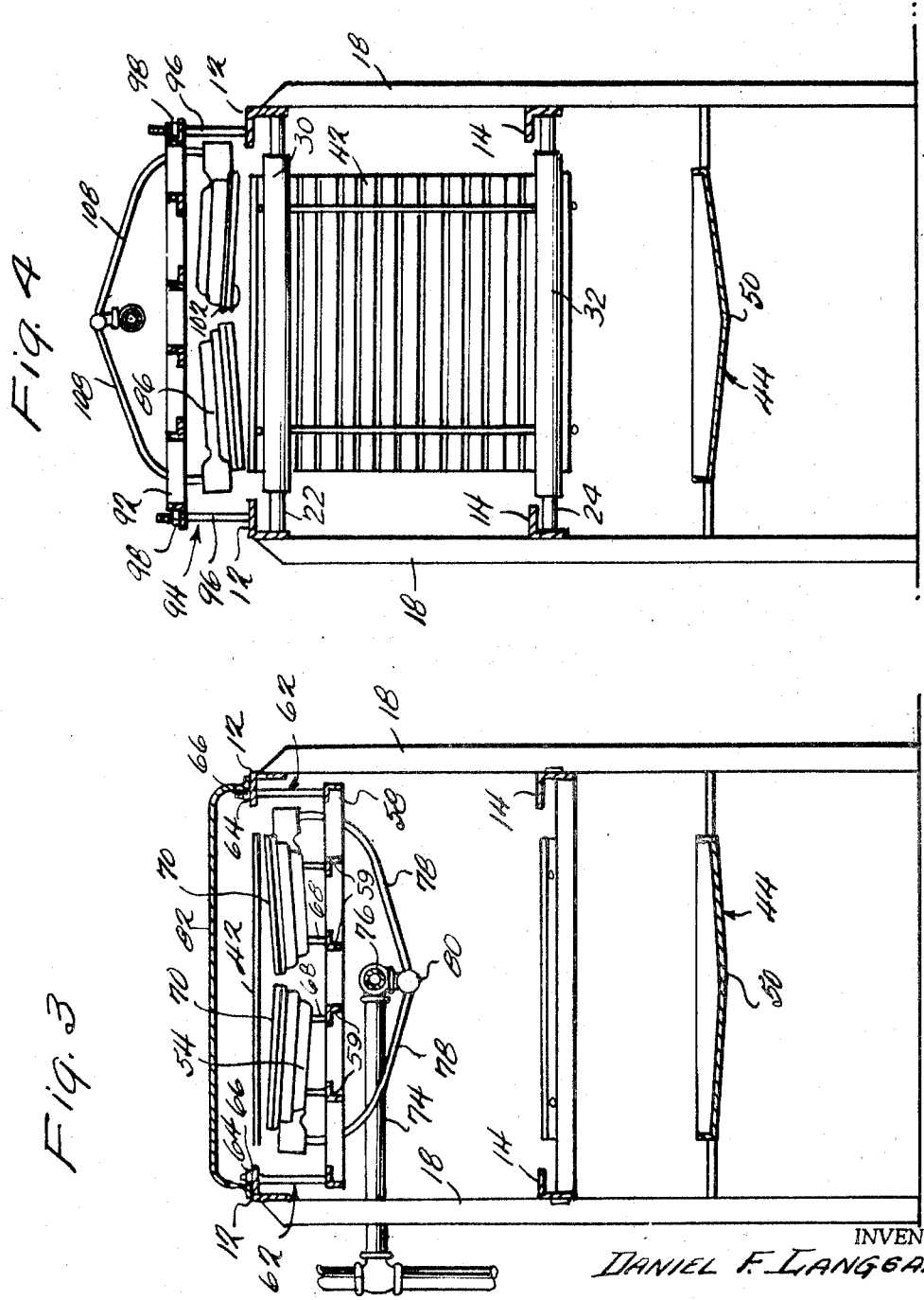

United States Patent Office 3,460,461
Patented Aug. 12, 1969

3,460,461
MECHANICAL HAMBURGER COOKER
Daniel Foster Langsam, Country Club, Apt. 5C,
Augusta, Ga. 30904
Filed Sept. 22, 1965, Ser. No. 489,139
Int. Cl. A47j 37/08, 37/10
U.S. Cl. 99—386                                                    1 Claim

ABSTRACT OF THE DISCLOSURE

Apparatus for cooking hamburgers including a conveyor means for moving the hamburgers, heating means comprising first heating assembly disposed below the conveyor means and second heating assembly disposed above the conveyor means, the first and second heating assemblies being horizontally offset from each other with the second heating assembly comprising a greater number of heating elements than the first heating assembly.

---

This invention relates to an automatic hamburger cooker having a movable support on which the hamburgers being cooked are supported and moved past heating means provided to cook the hamburgers. The heating means can comprise a first heating assembly arranged to cook, initially, the hamburgers from their underside and a second heating assembly arranged to cook, finally, the hamburgers from their upperside, said first and second heating assemblies being vertically spaced and horizontally offset from each other.

Heretofore it has been the practice, in automatically cooking hamburgers, to provide a movable support element such as a conveyor or rotary disk for supporting and moving hamburgers past heating means which provide the necessary heat to cook the hamburgers. Generally, known heating means include gas burners as well as infra-red heating elements which are so arranged that the hamburgers being cooked are exposed, simultaneously, at their upper and lower surfaces to heat provided by the heating means. Other conventional hamburger cooking equipment include a solid surface for supporting the hamburgers to be cooked, the solid surface being heated by a heating element with the hamburgers being manually or automatically turned at predetermined intervals of time.

However, known methods and apparatus for automatically cooking hamburgers have several disadvantages. Too often the hamburgers tend to stick to the surfaces on which they are supported thus causing unnecessary waste of product. In addition, known methods require expenditures in time and money to monitor the apparatus employed in an effort to overcome such disadvantages. It has also been found that the use of conventional hamburger cooking apparatus results in an excessive and, therefore, a commercially unattractive, degree of hamburger shrinkage whereby expected profits and customer satisfaction are seriously minimized.

It is therefore a principal object of the present invention to provide an improved hamburger cooker which overcomes the disadvantages of prior art apparatus.

It is another object of the instant invention to provide an improved apparatus and method for rapidly cooking hamburger with a minimum amount of waste due to shrinkage or sticking of the hamburger to movable support means.

A further object of the instant invention is to provide an improved apparatus for cooking hamburgers whereby the heat supplied to the hamburgers to be cooked can efficiently be controlled.

Yet another object of the instant invention is to provide an improved apparatus for cooking hamburgers wherein the heating means employed to cook the hamburgers is so arranged to provide an environment whereby the hamburgers are prevented from sticking to the movable support means employed to transport the hamburgers past the heating means.

Other objects and advantages of the invention will be in part evident to those skilled in the art and in part pointed out in the description taken in connection with the accompanying drawings, wherein there is shown by way of illustration and not of limitation a preferred embodiment of the invention.

In the drawings:

FIG. 2 is a side elevation of FIG. 1;

FIG. 3 is a sectional view taken along the line 3—3 of FIG. 2; and

FIG. 4 is a sectional view taken along the line 4—4 of FIG. 2.

Figure 1:
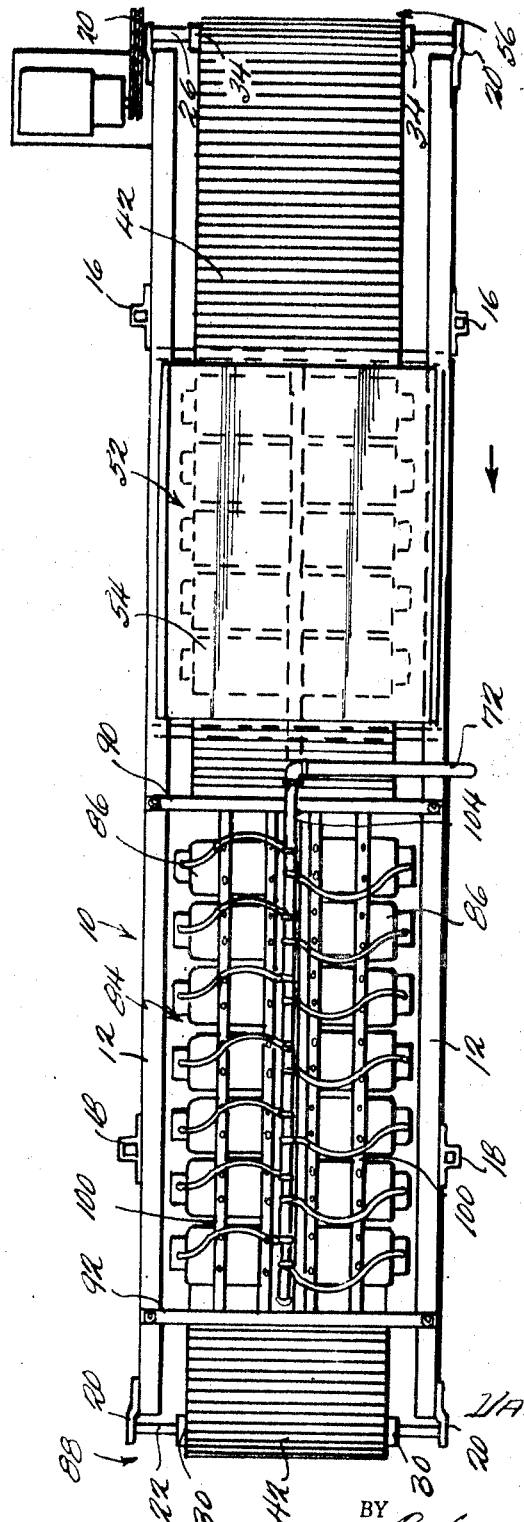
FIG. 1 is a plan view of an automatic hamburger cooker according to the instant invention.

Referring to the drawings, the hamburger cooker comprises a frame indicated generally at 10, which includes a pair of longitudinally extending upper supports 12 and a pair of longitudinally extending lower supports 14, said supports fixedly connected to a pair of vertically extending front leg members 16 and a pair of vertically extending rear leg members 18. The forward and rearward ends of the upper and lower supports are provided with bearing means 20 in which are journalled rearward conveyor upper and lower idler shaft means 22 and 24, forward conveyor upper idler shaft means 26 and forward conveyor lower drive shaft means 28. Fixedly mounted adjacent the outer ends of rearward conveyor upper and lower idler shaft means 22 and 24 are idler rolls 30 and 32, respectively. Fixedly mounted adjacent the outer ends of forward conveyor upper idler shaft means 26 is idler roll 34. Adjacent outer ends of forward conveyor drive shaft means 28 is drive roll 36 which is operatively connected to conveyor drive means 38 through belts means 40. Conveyor means 42 is located on the idler and drive rolls and preferably is made of a plurality of spaced stainless steel rods extending transverse to the longitudinal axis of the cooker assembly.

Fixedly supported by and between the vertically extending front and rear leg members 16 and 18, respectively, is drip pan means 44, extending substantially the length and width of the conveyor belt means 42. Preferably the drip pan means angles downwardly from its outer ends 46 and 48 to its midpoint 50, where, if desired, drain means (not shown) can be provided thereby continuously withdrawing grease generated during the cooking operation.

A first burner assembly comprises a plurality of rows 52 of individual heating elements 54 which are located adjacent the forward end 56 of the cooking apparatus and below the lower surface of the conveyor means 42 on its upper run. Preferably two rows are provided with five heating elements in each row, thereby providing heat to the entire surface of that portion of conveyor means 42 which it underlies. Also, preferably, each heating element comprises a gas burner of the type, for instance, described in U.S. Patents 2,775,294 and 2,870,830 to Schwank. Vertically adjustaby secured to the underside of longitudinally extending upper supports 12 are a pair of spaced burner supports 58 and 60, each extending transverse to the longitudinal axis of the cooker assembly. The burner supports depend from the supports 12 by vertical adjusting means 62 which, conveniently, can comprise threaded member 64 extending vertically beyond support member 12 and retainingly held in any predetermined position by bolt means 66. The portion of burner support members 58 and 60 remote from the support members 12 are fixedly attached to a plurality of spaced burner strap members 68 extending between the burner support members 58 and 60 and normal thereto. The strap members 68 can be fixedly attached to the support members 58 and 60 by L-shaped channel members 59 by any convenient means such as by welding, riveting or with other fastening means such as nuts and bolts. Fixedly supported on the upper surface of the strap members 68 are the heating elements 54 whose burner surfaces 70 face upwardly. The heating elements 54 are operatively connected to fuel supply line 72, through a longitudinally extending manifold 74. A T connection 76 is provided for each transversely arranged pair of burner elements, with each burner of the pair of burner elements being provided with a fuel feed line 78 in fluid communication with the manifold 74 through a fuel-tight swivel fitting 80 mounted on each T connection 76. This arrangement provides for convenient vertical adjustment of the lower burner assembly relative to the hamburgers being moved therepast, thereby effectively controlling the amount of heat delivered thereto in the initial cooking procedures. Heat reflecting means 82 can conveniently be provided above that portion of the conveyor means 42 underlain by the first burner assembly.

A second burner assembly comprises a plurality of rows 84 of individual heating elements 86 which are, preferably, of the same construction as heater elements 54. The second burner assembly is located adjacent the rearward end 88 of the cooking apparatus and above the upper surface of the conveyor means 42 on its upper run. Preferably two rows are provided with seven heating elements in each row thereby providing heat to the entire surface of that portion of conveyor means 42 which it overlies. Vertically adjustably secured to the upperside of longitudinally extending upper supports 12 are a pair of spaced burner supports 90 and 92, each extending transverse to the longitudinal axis of the cooker assembly. The burner supports 90 and 92 extend vertically above the supports 12 by means of adjusting means 94 which, conveniently, can comprise threaded members 96 extending vertically beyond support members 12 and retainingly held in any predetermined position by nut members 98. The portion of burner support members 90 and 92 remote from support member 12 are fixedly attached to a plurality of spaced burner strap members 100 extending between the burner support members 90 and 92 and normal thereto. The strap members 100 can be fixedly attached to the support members 90 and 92 by any convenient means as by welding, riveting, etc. Fixedly supported on the lower surface of strap members 100 are the heating elements 86 whose burner surfaces 102 face downwardly. The heating elements 86 are operatively connected to fuel supply line 72 through a longitudinally extending manifold 104. A T connection 106 is provided for each transversely arranged pair of burner elements, with each burner of the pair of burner elements being provided with a fuel feed line 108 in fluid communication with manifold 104 through a fuel-tight swivel fitting 110 mounted on each T conection 106. This arrangement also provides for convenient vertical adjustment of the upper burner assembly relative to the hamburgers moved therepast, thereby effectively controlling the amount of heat delivered thereto in the final cooking operation. Adjacent the rearward end of the cooking apparatus and in cooperation with the conveyor means 42 as it approaches the end of the upper run is meat deflector means 112 which conveniently assists in guiding the cooked hamburgers to a receptacle (not shown).

In operation, conveyor drive means 38 can be actuated thereby causing conveyor means 42 to travel in the direction of the arrow shown in FIG. 1. At the same time the first and second gas burner assembly can be lit and hamburger patties supplied to the conveyor belt adjacent the forward end 56 of the cooker assembly. The hamburgers can be pre-formed manually or automatically and can be delivered to the conveyor 42 manually or automatically.

On the upper run of conveyor means 42 the hamburgers supported thereon pass over the first heater assembly comprising two rows 52 of heating elements 54, there being five heating elements in each row. The temperature at the surface of the burners is about 1650° F. and the heat output is controlled to cook the underside of the hamburgers sufficiently to prevent sticking on the movable support 42. The degree of cooking can also be controlled by varying the speed of the conveyor 42 by adjusting drive means 38 as well as by adjusting the vertical distance of the first heater assembly from the more proximate surface of the hamburgers being cooked. The degree or extent of cooking will be dictated by the degree of rarity of the final product desired. Preferably the heat supplied to the underside of the hamburgers is also sufficient to prevent excess production of grease from the hamburgers, which grease, when produced, is removed from the system by drip pan 44.

Thereafter, the partially cooked hamburgers are moved past a second heating assembly disposed above the conveyor means 42, the second heating assembly being comprised of two rows 84 of heating elements 86, with each row having seven individual heating elements. The individual heat output of each heating element 86 in the second heating assembly can be, essentially, the same as those of the first heating assembly. Further, the second heating assembly is vertically adjustable to assist in controlling the heat supplied to the upperside of the hamburgers although it will be recognized that the total output of heat of the second heater assembly generally will be greater than that of the first heater assembly to insure complete cooking of the hamburger.

As the cooked hamburgers approach the end 88 of the upper run of conveyor 42 they can be removed therefrom with the aid of deflection means 112 which preferably is made of aluminum or stainless steel.

The first and second heating assemblies can be vertically adjusted by adjusting the threaded means 62 and 94, respectively, to raise or lower the assemblies as desired. It will be noted that the fuel feed lines 78 and 108 are pivotally adjusted via fuel-tight swivel fittings 80 and 110 to compensate for the vertical movement of the rows of heating elements 54 and 86.

From the foregoing it will be seen that due to the construction shown and described a device is provided which can accomplish the cooking of six to seven thousand hamburgers per hour. In a preferred embodiment the device of this invention is about ten feet long and two feet wide and the hamburger cooked on the device of this invention experiences only about one-half ounce shrink per hamburger patty compared to one to two ounces shrink on conventional machines cooking the same size hamburgers.

Having thus described the invention, what is claimed is:

1. Apparatus for cooking hamburgers comprising: conveyor means for movably supporting said hamburgers having a forward end for receiving hamburgers to be cooked, a rearward end for discharging cooked hamburgers, and a portion intermediate said forward and rearward ends; adjustable means for actuating said conveyor means at variable speeds; heating means consisting of a first heating assembly and a second heating assembly only, with substantially the entire extent of said first heating assembly lying forward of a point in said intermediate portion and below said conveyor means, and substantially the entire extent of said second heating assembly lying rearward of said intermediate point and above said conveying means, each of said first and second heating assemblies including means for adjusting the vertical distance between the respective heating assembly and the conveyor means; said first and second heating assemblies being provided with a plurality of gas burners, said first and second heating assemblies extending along said conveyor, the longitudinal extent of said second heating assembly being greater than the longitudinal extent of said first heating assembly; whereby the conveyor speed and the vertical distance between the respective first and second burner assemblies and the conveyor may be adjusted such that the hamburgers will first be heated from the bottom by the first heating assembly as much as possible without sticking to said conveyor, and then will pass beyond said first heating assembly and underneath said second heating assembly where they will be cooked from above until cooked to the desired degree, and will then be discharged off the end of the conveyor.

References Cited

UNITED STATES PATENTS

| | | |
|---|---|---|
| 784,854 | 3/1905 | Grace. |
| 1,656,709 | 1/1928 | Kelly. |
| 1,662,847 | 3/1928 | Cook. |
| 2,584,584 | 2/1952 | Hoffman et al. ____ 99—386 XR |
| 2,655,096 | 10/1953 | Ebin _____ 99—420 |
| 3,019,744 | 2/1962 | Carvel. |

WALTER A. SCHEEL, Primary Examiner

JOHN M. BELL, Assistant Examiner

U.S. Cl. X.R.

99—423, 443